(12) United States Patent
Gorsica et al.

(10) Patent No.: US 8,095,191 B2
(45) Date of Patent: Jan. 10, 2012

(54) DETECTION AND FUNCTION OF SEVEN SELF-SUPPORTED ORIENTATIONS IN A PORTABLE DEVICE

(75) Inventors: John J. Gorsica, Round Lake, IL (US); Erik A. Cholewin, Libertyville, IL (US); Michael J. Lombardi, Lake Zurich, IL (US); Natalie J. Prochnow, Spring Grove, IL (US); Ian M. Snyder, Vernon Hills, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 417 days.

(21) Appl. No.: 12/497,911

(22) Filed: Jul. 6, 2009

(65) Prior Publication Data

US 2011/0003616 A1 Jan. 6, 2011

(51) Int. Cl.
*H04M 1/00* (2006.01)
(52) U.S. Cl. .......... 455/575.3; 455/575.1; 455/128
(58) Field of Classification Search .......... 455/556.2, 455/556.1, 566, 550.1, 575.1, 575.3, 90.3, 455/344, 347, 349, 345; 345/156–158
See application file for complete search history.

(56) References Cited

U.S. PATENT DOCUMENTS

| | | | |
|---|---|---|---|
| 5,128,671 | A | 7/1992 | Thomas, Jr. |
| 5,543,588 | A | 8/1996 | Bisset et al. |
| 5,610,971 | A | 3/1997 | Vandivier |
| 5,729,219 | A | 3/1998 | Armstrong et al. |
| 5,896,575 | A | 4/1999 | Higginbotham et al. |
| 5,898,600 | A | 4/1999 | Isashi |
| 6,020,878 | A | 2/2000 | Robinson |
| 6,201,554 | B1 | 3/2001 | Lands |
| 6,392,870 | B1 | 5/2002 | Miller, Jr. |
| 6,466,198 | B1 | 10/2002 | Feinstein |
| 7,218,313 | B2 | 5/2007 | Marcus et al. |
| 2004/0179091 | A1* | 9/2004 | Aoike ................. 348/14.02 |
| 2004/0198466 | A1* | 10/2004 | Walby et al. ................. 455/574 |
| 2004/0242266 | A1* | 12/2004 | Tagliabue et al. ......... 455/556.1 |
| 2005/0020325 | A1 | 1/2005 | Enger et al. |
| 2005/0075123 | A1* | 4/2005 | Jin et al. ................. 455/522 |

(Continued)

FOREIGN PATENT DOCUMENTS

EP 0 913 977 A2 5/1999

(Continued)

OTHER PUBLICATIONS

Patent Cooperation Treaty, "PCT Search Report Written Opinion of the International Search Authority" for International Application No. PCT/US2010/038803 (Oct. 6, 2010).

(Continued)

*Primary Examiner* — Meless N Zewdu
*Assistant Examiner* — William Lu (57) ABSTRACT

An improved mobile electronic device 100 with a unique thin and cost-effective form and design can have a large display 170 in the outward surface of a flip 102, a large full qwerty keypad 138 in the outward surface of a base 108, and a touchpad 186 in the inward surface of the flip. Advantageously, the mobile electronic device is movable to seven different orientations for providing different modes in partially open positions. The mobile electronic device can have a single accelerometer 206, such as located in the flip, or two accelerometers 130 with one accelerometer in the flip and one in the base, to accurately detect the orientation, flip angle, and mode of the mobile electronic device.

19 Claims, 9 Drawing Sheets

U.S. PATENT DOCUMENTS

| | | | |
|---|---|---|---|
| 2005/0250562 A1* | 11/2005 | Carroll | 455/575.3 |
| 2006/0197750 A1 | 9/2006 | Kerr et al. | |
| 2006/0240866 A1* | 10/2006 | Eilts | 455/556.1 |
| 2006/0264243 A1* | 11/2006 | Aarras | 455/566 |
| 2007/0097151 A1 | 5/2007 | Rosenberg | |
| 2008/0051041 A1* | 2/2008 | Griffin et al. | 455/90.3 |
| 2008/0058006 A1* | 3/2008 | Ladouceur | 455/556.1 |
| 2008/0261661 A1 | 10/2008 | Jessop | |
| 2008/0280641 A1* | 11/2008 | Kristensson et al. | 455/556.1 |
| 2008/0280642 A1* | 11/2008 | Coxhill et al. | 455/556.1 |
| 2009/0066660 A1 | 3/2009 | Ure | |
| 2009/0088204 A1* | 4/2009 | Culbert et al. | 455/556.1 |
| 2009/0096749 A1 | 4/2009 | Kawahara et al. | |
| 2009/0140863 A1 | 6/2009 | Liu et al. | |
| 2009/0143098 A1* | 6/2009 | Shiono | 455/556.1 |
| 2009/0191854 A1* | 7/2009 | Beason | 455/418 |
| 2009/0195350 A1* | 8/2009 | Tsern et al. | 340/3.1 |
| 2009/0239586 A1* | 9/2009 | Boeve et al. | 455/566 |
| 2010/0015992 A1* | 1/2010 | Wakefield | 455/456.1 |
| 2010/0022274 A1* | 1/2010 | Roberts et al. | 455/566 |
| 2010/0069115 A1* | 3/2010 | Liu | 455/556.1 |
| 2010/0081473 A1* | 4/2010 | Chatterjee et al. | 455/559 |
| 2010/0137022 A1* | 6/2010 | Yang et al. | 455/552.1 |
| 2010/0177044 A1* | 7/2010 | Plestid | 345/167 |
| 2010/0248792 A1* | 9/2010 | Yamashita | 455/566 |
| 2010/0304795 A1* | 12/2010 | Laine et al. | 455/575.1 |

FOREIGN PATENT DOCUMENTS

| | | |
|---|---|---|
| EP | 1653713 B1 | 5/2006 |
| EP | 1806908 A2 | 7/2007 |
| WO | WO03046705 A2 | 6/2003 |
| WO | WO2008007261 A2 | 1/2008 |

OTHER PUBLICATIONS

International Application No. PCT/FI2004/000381, filed Jun. 23, 2004, International Publication No. WO 2004/114636 A1, published Dec. 29, 2004, of Nokia Corporation, of inventors Mantysalo et al., pertains to a Multifunctional UI Input Device for Mobile Terminals.

Publication: Gerry Chu et al., "Lucid Touch prototype" published by lucid touch microsoft research & mitsubishi electric research labs, Nov. 26, 2008.

Publication: Illustration of GPS system, published by lucid touch microsoft research & mitsubishi electric research labs, Nov. 26, 2008.

\* cited by examiner

DETECTION AND FUNCTION OF SEVEN SELF-SUPPORTED ORIENTATIONS IN A PORTABLE DEVICE

BACKGROUND OF THE INVENTION

1. Field of the Disclosure

The disclosure relates in general to mobile devices, and more particularly, to mobile electronic devices with an electronic display and a keypad. In certain embodiments, the mobile electronic device comprises a mobile telephone, but the disclosure is not limited to mobile telephones.

2. Background Art

There is a significant market for mobile electronic devices with large displays coupled with large, full qwerty keypads, which can be addressed through the implementation of a unique, thin, and cost-effective mobile electronic device with a keypad on the back of a clamshell device with a single display on the front of the device.

Prior mobile electronic devices with large displays and large full-qwerty keypads include side sliders or sliding displays that reveal a qwerty keypad underneath the display and clam style hinged units with a display that reveals a second display and qwerty keypad when opened.

It is desirable to create a form factor and design of an improved mobile electronic device which enables new and unique device orientations, as well as to achieve engineered solutions for orientation detection and activate unique device behavior in these different orientations.

It is also desirable to provide a multiple position flip detector and method to detect and sense multiple positions of the flip and different orientations and modes of an improved mobile electronic device in order to provide users with maximum functionality.

It is further desirable to provide different screen and device orientations and modes to use with different applications and the user interface (UI) of the mobile electronic device.

SUMMARY OF THE INVENTION

An improved mobile electronic device with a unique thin and cost-effective form and design is provided that is user-friendly, reliable, fun and effective. The attractive mobile electronic device can have a large display on the outward surface of a flip or slide, a large full qwerty keypad on the outward surface of a base and a capacitive touchpad on the inward surface of the flip or slide. The multi-functional mobile electronic device is easy to use, comfortable and economical.

The mobile electronic device can be a radiotelephone, a cellular (cell) phone, a mobile phone, smart phone, flip phone, slider phone, portable networking device, qwerty flip device, wireless device, portable gaming device, mobile communications device, personal digital assistant (PDA), wireless e-mail device, a two way pager, internet communication device, hand held electronic device, or combinations of the preceding. Desirably, the mobile electronic device is of a compact size for readily fitting in a shirt pocket, pants pocket, suit pocket, and/or purse.

The attractive mobile electronic device creates a form factor and design of an improved mobile electronic device which enables new and unique device orientations, as well as achieves engineered solutions for orientation detection and activates unique device behavior in these different orientations.

The novel mobile electronic device provides a multiple position flip detector and method to detect and sense multiple positions of the flip and different orientations and modes of the improved mobile electronic device in order to provide users with maximum functionality.

The inventive mobile electronic device can further provide different screen and device orientations to use with different applications within the mobile electronic device.

The improved mobile electronic device can combine the use of a dual output hall-effect sensor (switch), friction hinge, and a single accelerometer or dual accelerometers preferably without hall-effect sensors and magnets to enable detection of as many as seven (7) distinct and self-supported orientations that provide modes and/or configurations, in the partially open positions of the mobile electronic device, as indicated hereinafter.

Orientation/Mode 1 where the mobile electronic device is standing on one end.

Orientation/Mode 2 where the mobile electronic device is standing on the other end in an upside down mode.

Orientation/Mode 3 where the base is placed battery door side down on a horizontal flat surface, such as a table, desk, shelf, etc. and the touchscreen display hangs over the edge, such as like a space-saver TV.

Orientation/Mode 4 where the mobile electronic device is placed in an inverted L shaped orientation with the keypad vertical and the display is horizontal on a user's side in a landscape orientation with the hinge facing up so that the device is flipped up to view the main display.

Orientation/Mode 5 where the edge (side) of the base and edge (side) of the flip support the mobile electronic device in a landscape orientation in an upside down V-shaped configuration.

Orientation/Mode 6 where the flip is placed display down and the base is positioned and supported so that the imager (camera) can be used as a tethered webcam or the flash can be used as flashlight.

Orientation/Mode 7 where the base is placed keypad side down and the flip is positioned and supported in a landscape viewing orientation.

Modes 5 and or 7 can comprise an alarm clock where the mobile electronic device goes into an alarm clock mode. Within the alarm clock mode, the user may tap the screen to snooze and close the flip to disable.

Modes 1 and/or 2 can comprise a camera tripod mode for a self-standing portrait orientation where the mobile electronic goes immediately into an imager timer mode and a flash, such as a light-emitting diode (LED), visibly counts down the time to image capture, such as 5 flashes, 10 flashes, etc.

Mode 6 can comprise a webcam mode in a self-standing landscape orientation where the mobile electronic device links to a computer as a webcam. Within the webcam mode, a touchpad on back of flip can be used for zoom functionality and/or screen capture. Mode 6 can further comprise a projector mode in a self-standing landscape orientation wherein the illumination source is a projector which projects an image from the mobile electronic device and the touchpad on the flip can be used for mouse cursor or zoom functionality Mode 6 can also comprise a flashlight mode in a self-standing landscape orientation where the mobile electronic device is placed display side down in a half or partially open position and the flash automatically enters a torch mode.

Mode 4 can comprise a holster mode where the mobile electronic device is placed on a user's side in landscape orientation with the hinge facing up and the mobile electronic device can be flipped up to view the main display without unholstering.

Modes 3, 5 and/or 7 can activate or launch a global positioning system (GPS), music player, video player, photo slide show, alarm clock, and/or video camera.

The mobile electronic device can also provide a mini projector to project images, text or other graphics on a wall.

The mobile electronic device can have a friction hinge in combination with a single accelerometer and a dual output hall-effect sensors to allow the mobile electronic device to recognize and support itself in the seven (7) different orientations. With this setup, many advantageous orientations and functionalities are possible.

For even better flip detection and performance, two accelerometers without hall-effect sensors or magnets can be used. Preferably, one of the accelerometers is placed in the flip and the other accelerometer is placed in the base. This eliminates the need for hall-effect sensors and magnets. Better and more accurate detection can be attained by not relying on variable magnetism to perform flip detection. Much more precise information regarding flip state can also be attained. This arrangement provides exact orientation of the flip and base, not just one or the other.

Advantageously, since no magnets need be used with the accelerometers, the improved mobile electronic device will not magnetize credit cards, hotel cardkeys, bank cards, car keys, driver's licenses, building pass cards, bus cards, railway cards, library cards, movie cards, identification cards, and other cards with magnetic strips.

The preferred mobile electronic device can use a pair of accelerometers: one in a flip and one in the base in order to provide both display orientation information and flip angle information. This can also be useful in any clamshell device, but is especially useful in the illustrated mobile electronic device as well as in multi-axis devices to establish the exact positional and rotational information of the mobile electronic device.

A dual accelerometer approach provides more precise angular information to the device. The use of two accelerometers is different from the typical hall-effect flip detect mechanism and offers distinct advantages. Chief among them: more precise angular data can be obtained from the two sensors and the reliability of flip detect is improved since external magnets or magnetized device housings won't affect function.

The mobile electronic device can comprise a base that can provide a transceiver housing and can include a flip that is pivotably connected to the base by a hinge. The flip can be pivotable from a closed position, to different partially open positions and to a fully open position and vice versa. The mobile electronic device can further comprise: a keypad with an imager and a flash on the outward surface of said base, a display on the outward surface of the flip, a touchpad on the inward surface of said flip, and a battery door positioned along the inward surface of the base. The display can comprise a touchscreen display. The imager can be a camera, camera lens, zoom lens, and/or web cam. Desirably, the mobile electronic device is movable to different orientations for providing different modes and configurations, in the partially open positions.

The mobile electronic device can have an accelerometer in the flip for detecting the orientation and mode of the mobile electronic device. Additionally, the mobile electronic device may have dual accelerometers without hall-effect sensors including one accelerometer in the flip and another accelerometer in the base for detecting the orientation and mode of the mobile electronic device. Most preferably, the mobile electronic device has dual accelerometers and does not use magnets for detecting the orientation and mode of the mobile electronic device, as well as the flip angle of the flip.

This invention as described in the specification and patent claims achieves excellent performance.

A more detailed explanation of the invention is provided in the following detailed descriptions and appended claims taken in conjunction with the accompanying drawings.

DETAILED DESCRIPTION OF THE INVENTION

The following is a detailed description and explanation of the preferred embodiments of the invention and best modes for practicing the invention.

Referring to the drawings, a mobile electronic device 100 can comprise a flip 102 which can be pivotally connected by a hinge 104 to a base 106. The flip can be pivotable from a closed position, to partially open positions and to a fully open position and vise versa. The mobile electronic device can be movable to different orientations for providing different functionality in the partially open positions.

The mobile electronic device can be: a flip phone, portable networking device, internet communications device, clamshell device, radio telephone, cellular phone, mobile phone, smart phone, portable gaming device, personal digital assistant, wireless e-mail device, two-way pager, handheld electronic device, or combinations of the preceding. The mobile electronic device preferably is of a compact size for readily fitting in a shirt pocket, pants pocket, suit pocket, and/or purse.

The base and the flip each can have an outward (outer) surface 108 or 110, an inward (inner) surface 112 or 114, edges comprising longitudinal sides 115, 116, 117 or 118 in a portrait mode, and lateral ends 119, 120, 121 or 122 in a portrait mode.

The base can have a transceiver housing 123 (xcvr) and defines an internal base compartment that can provide a cavity for containing a battery and a speaker. A base accelerometer 130 (second accelerometer) (FIGS. 17-22) can be positioned in the base compartment, preferably without hall effect sensors or magnets, to assist in detecting and sensing the orientation and mode of the mobile electronic device as well as the flip angle of the flip.

The base can have a keypad assembly 132 which can comprise a keypad 138 and backlighting below the keypad. The keypad can be positioned on the outward surface of the base and can face downwardly when the flip is in the partially open position, such as in a media viewing mode. The keypad can be partially transparent, clear and light transmissive. The keypad can comprise: a qwerty keypad, capacitive keypad, keyboard, alpha numeric keys, a base touchscreen, or combinations of the preceding. The keypad can occupy most, preferably 70% to 99% of the outward surface of the base.

The keypad can also comprise graphics on an underside of the keypad or on a layer below the keypad. Such graphics for the keypad can include one or more of the following: text, numbers, characters, alpha numeric images, color graphics, black graphics, moving graphics, animation, video clips, logos, decorations, designs, symbols, and other images.

The keypad can comprise a recessed keypad positioned below the maximum elevation or height of the rim which provides the top of said housing so that when the keypad assembly is placed on a support surface, such as a table, desk, or shelf, the rim engages the surface, but the recessed keypad is spaced above the support surface and prevented from touching or otherwise engaging the support surface.

The keypad can include an illumination source 154, such as a flash, light-emitting diode (LED) flash, xenon flash, projector other illumination source, in proximity to an imager 156, such as a camera, webcam, camera lens, zoom lens, webcam, or other image capture device. The keypad assembly can include a light barrier, such a light-blocking gasket or ribs, for substantially preventing the flash from illuminating graphics on the keypad and for substantially minimizing hot spots in images captured by the imager. Desirably, the light-blocking gasket can also prevent the backlighting from being visible through the imager and about the flash or flash hole. Patterns can be molded over the flash for focusing light emitted from the flash and providing a lens for the flash.

A display housing 164 can provide a display module and a touchscreen display 170 on the outward surface of the flip. The display can be positioned opposite the keypad when the flip is in a closed position in a tablet mode. The display can face upwardly with and in proximity to the keypad when the flip in a fully open position in an e-mail/text mode. The display can be positioned at an angle of inclination when the flip is in a partially open position in a media viewing mode. The display can occupy most, preferably 70% to 99% of the outward surface of the base.

The display can comprise a touchscreen comprising a touch sensitive lens with an input lens surface. Touch sensors can be integrated to either the input surface or the opposite surface of the lens. The touchscreen display can be can be a transparent, clear and light transmissive and can comprise a capacitive touchscreen, an organic light emitting display (OLED) or a liquid crystal display (LCD). The touchscreen can show and electronically display graphics, such as, but not limited to one or more of the following: text, numbers, characters, alpha numeric images, color graphics, black graphics, moving graphics, animation, video clips, logos, photographs, decorations, designs, symbols, and other images.

A touchpad 186 can be positioned on the inward surface of the flip at a location which is transversely opposite of the display. The touchpad can provide navigation control within the user interface (UI) on the display, such as, but not limited to: highlighting a web link on the display, scrolling through text on the display, clicking to enter a command on the display, and/or implementing a mouse cursor on the touchscreen. The touchpad can also comprise one or more of the following: zoom control, a magnifier, scroll bar, scroll control, a slide bar in a browser window, enter key, command key, shift key, visual selector, cursor, and/or pointer. The touchpad can occupy a substantial portion, such as from 25% to 75%, of the inward surface of the flip. In the illustrative embodiment, the touchpad is smaller and occupies a smaller area than either the touchscreen display or the keypad.

Advantageously, the touchpad is positioned to be touched by the user without blocking viewing of the display when the flip is in the partially open and fully open positions. The touchpad can be hidden and inaccessible when the flip is in the closed position.

A removable battery door 194 can be positioned along the inward surface of the base at a location transversely opposite of the keypad. The removable battery door can be hidden and inaccessible when the flip is in the closed position.

A speaker port can be hidden underneath the removable battery door. The speaker port can provide an acoustical passageway for emitting sound from the speaker.

A flip accelerometer 206 (first accelerometer) (FIGS. 17-22) can be positioned in the flip compartment, preferably without hall effect sensors or magnets, to assist in detecting and sensing the orientation and mode of the mobile electronic device, as well as to detect and sense the angle of inclination of the flip relative to the base which is also referred to as the flip angle. The flip angle can range from zero to 190 degrees.

The flip accelerometer and the base accelerometer can be placed next to each other in the mobile electronic device like traditional magnetic switch systems. However, the flip accelerometer and the base accelerometer can also be placed in different areas of the mobile electronic device since they do not need to directly interact. Furthermore, the accelerometers do not need to be aligned with each other nor do they require magnets in contrast to hall effect sensors. The accelerometers can detect and sense any flip angle and are not limited to two or three flip angles. Desirably, the accelerometers are not dependent on magnetism and are more reliable for accurate repeatable performance. Either or both of the accelerometers can be used to change the graphics on the display from a portrait mode to a landscape mode and vice versa.

As shown in FIGS. 23-29, the mobile electronic device is movable to different orientations to provide different modes in the partially open position. The orientations/modes can comprise the orientations and modes indicated hereinafter.

Orientation/Mode 1 as shown in FIG. 23 where the mobile electronic device is standing on one end.

Orientation/Mode 2 as shown in FIG. 24 where the mobile electronic device is standing on the other end in an upside down mode.

Orientation/Mode 3 as shown in FIG. 25 where the base is placed battery door side down on a horizontal flat surface, such as a table, desk, shelf, etc. and the touchscreen display hangs over the edge, such as like a space-saver TV.

Orientation/Mode 4 as shown in FIG. 26 where the mobile electronic device is placed in an inverted L shaped orientation with the keypad positioned vertically and the display positioned horizontally on a user's side in a landscape orientation with the hinge facing up so that the mobile electronic device is flipped up to view the main display.

Orientation/Mode 5 as shown in FIG. 27 where the edge (side) of the base and edge (side) of the flip support the mobile electronic device in a landscape orientation in an upside down V-shaped configuration.

Orientation/Mode 6 as shown in FIG. 28 where the flip is placed display down and the transceiver housing (xcvr) is positioned and supported so that the imager (camera) can be used as a tethered webcam and/or the flash can be used as flashlight.

Orientation/Mode 7 as shown in FIG. 29 where the base is placed keypad side down and the flip is positioned and supported in a landscape viewing orientation.

Modes 5 and or 7 can comprise an alarm clock mode where the mobile electronic device functions as an alarm clock. Within the alarm clock mode, the user may tap the screen to snooze and close the flip to disable.

Modes 1 and/or 2 can comprise a camera tripod mode for a self-standing portrait orientation where the mobile electronic goes immediately into an imager timer mode and a flash, such as a light-emitting diode (LED), visibly counts down the time to image capture, such as 5 flashes, 10 flashes, etc.

Mode 6 can comprise a webcam mode in a self-standing landscape orientation where the mobile electronic device links to a computer as a webcam. Within the webcam mode, a touchpad on back of flip can be used for zoom functionality and/or screen capture.

Mode 6 can also comprise a flashlight mode in a self-standing landscape orientation where the mobile electronic device is placed display side down in a half or partially open position and the flash automatically enters a torch mode.

Mode 4 can comprise a holster mode where the mobile electronic device is placed on a user's side in landscape orientation with the hinge facing up and the mobile electronic device can be flipped up to view the main display without unholstering.

Modes 3, 5 and/or 7 can activate or launch a global positioning system (GPS), music player, video player, photo slide show, alarm clock, and/or video camera.

The mobile electronic device can also provide a mini projector to project images, text or other graphics on a wall.

The mobile electronic device can have a friction hinge in combination with a single accelerometer in the flip such as with dual output hall-effect sensors to allow the mobile electronic device to recognize the seven (7) different self-supported orientations. With this setup, many advantageous orientations and functionalities are possible.

The hinge can comprise a friction hinge which can have a radial range of motion of 180 degrees or more and can have detents at both ends of travel. This can be achieved through the use of an asymmetrical cam in conjunction with a single tab on a follower. The friction hinge also provides a dependable and inexpensive way to produce a tilt in the display of a qwerty flip device or in a qwerty mode.

Figure 5:
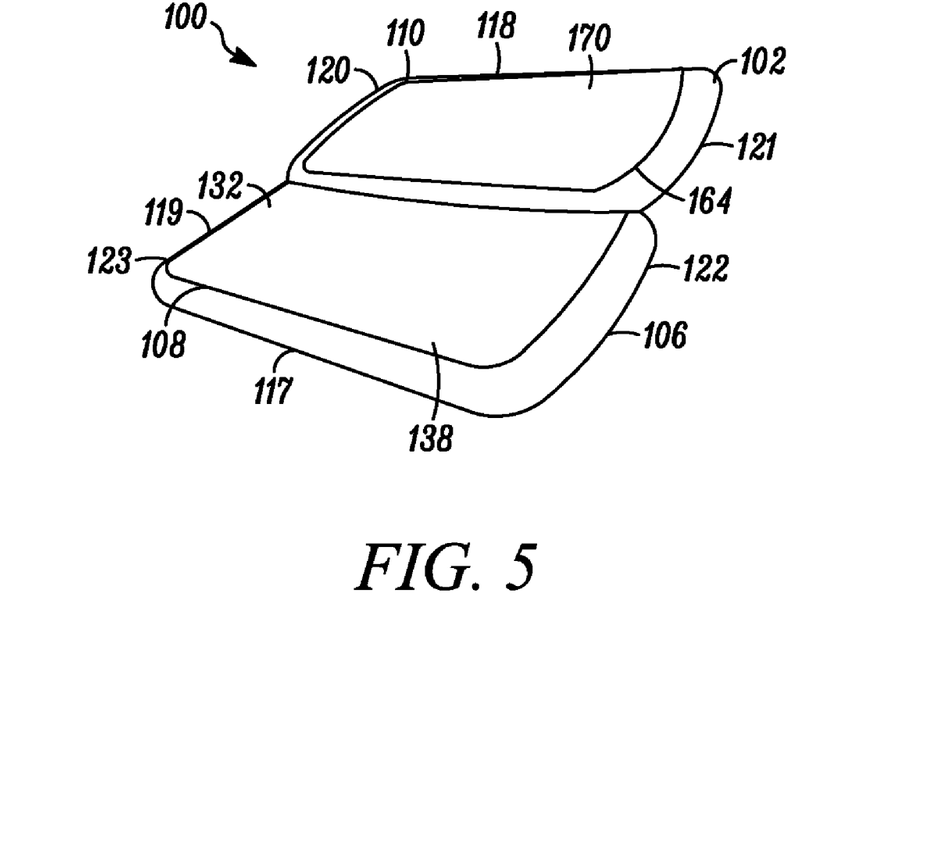
FIG. 5 is a perspective view of the mobile electronic device shown in a fully open position in a text entry mode.
Figure 6:
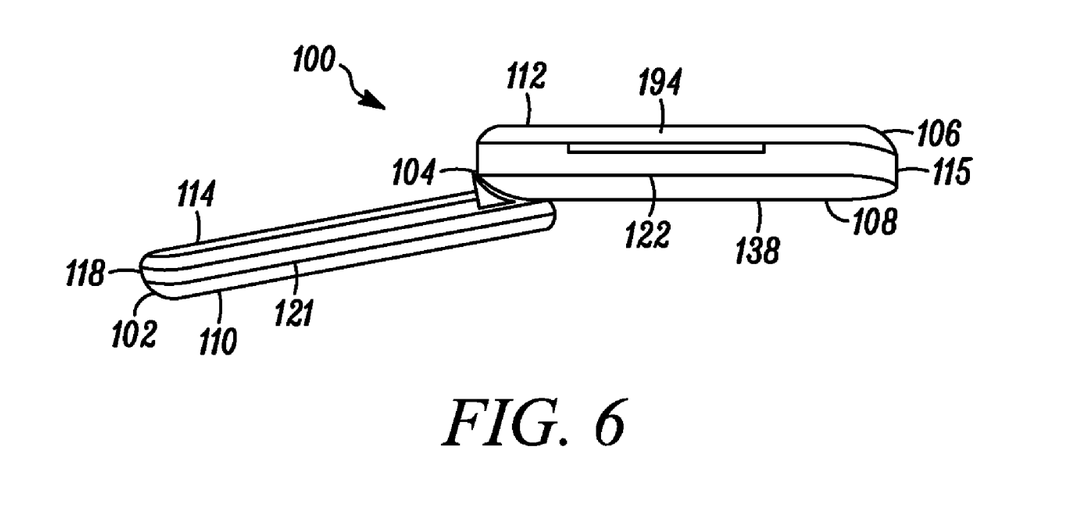
FIG. 6 is a side view of the mobile electronic device shown in the fully open position in the text entry mode.
Figure 7:
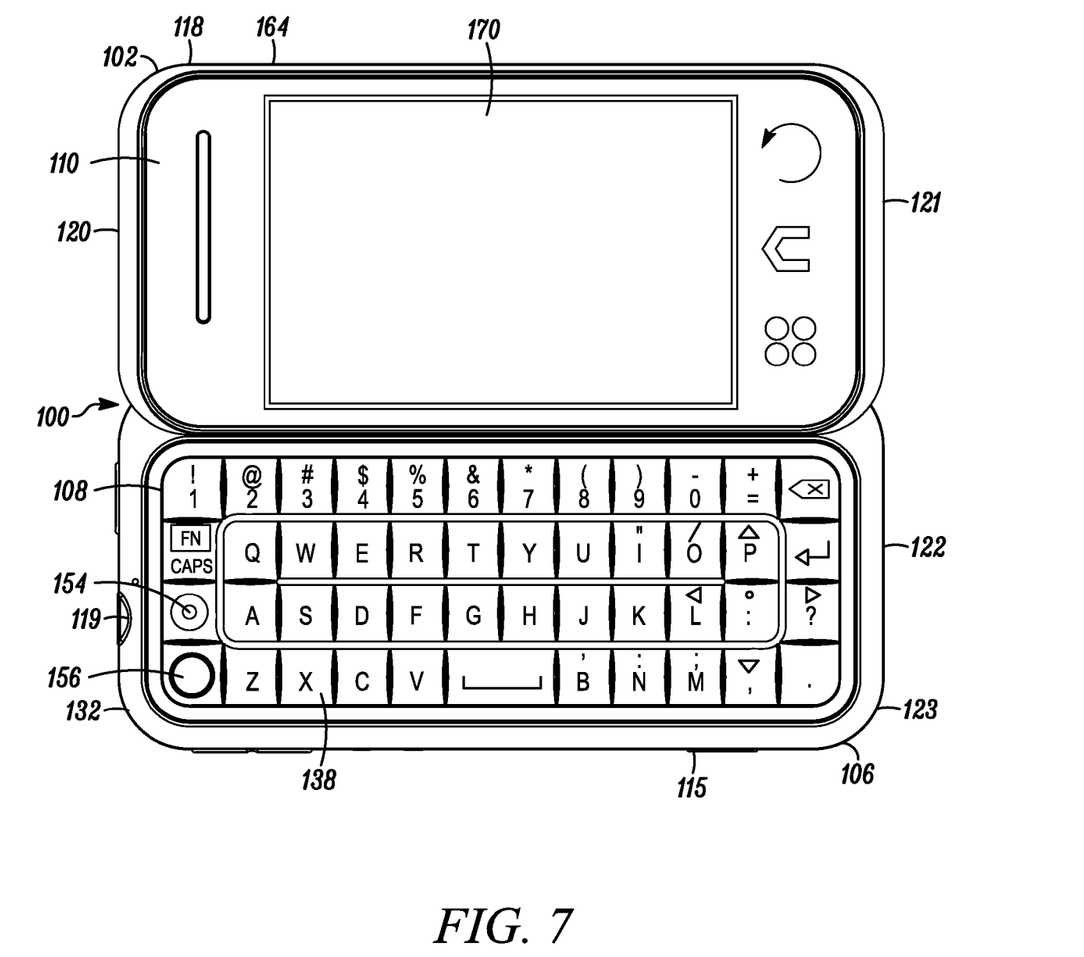
FIG. 7 is a front view of the mobile electronic device shown in the open position.
Figure 8:
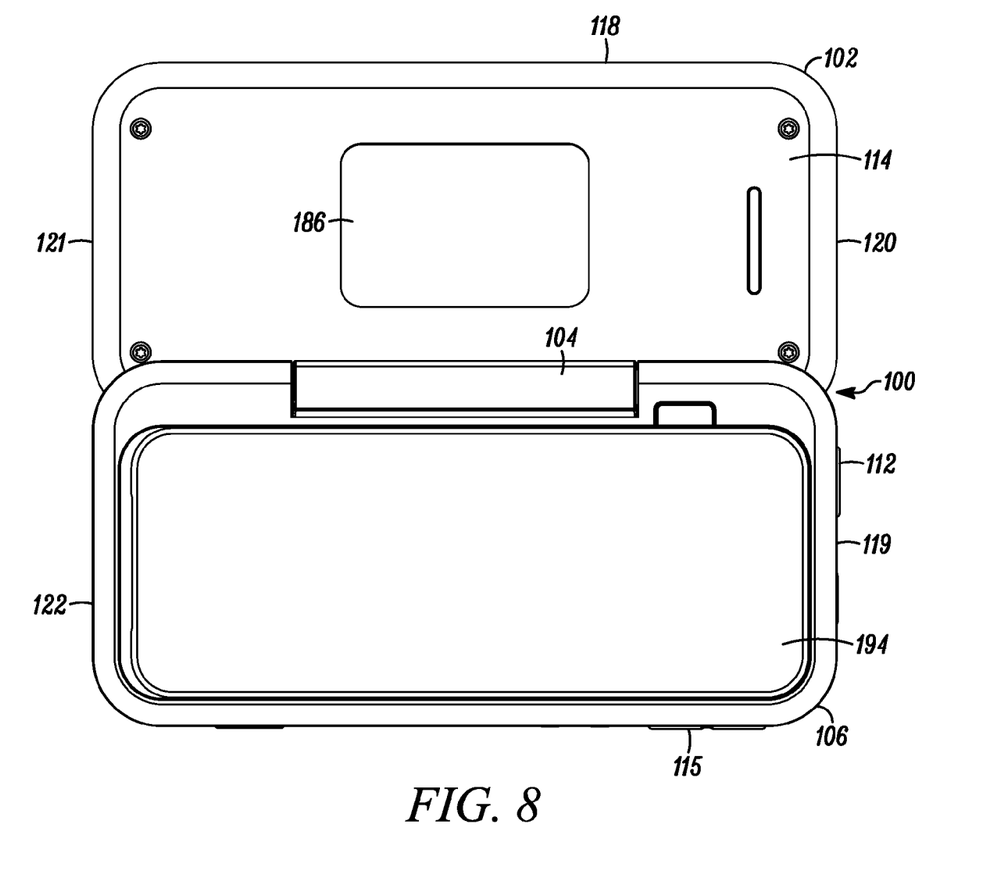
FIG. 8 is a back view of the mobile electronic device shown in the open position.
Figure 9:
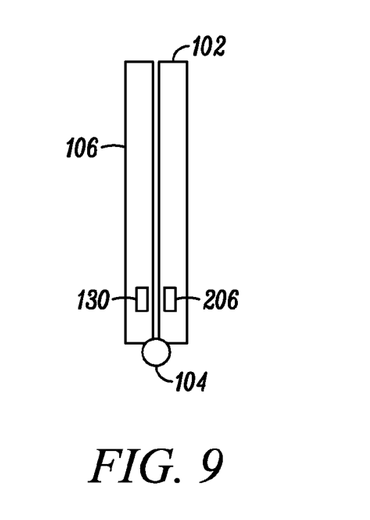
FIG. 9 is a diagram of a cross-sectional view of the mobile electronic device shown in the closed position and illustrating dual accelerometers.
Figure 10:
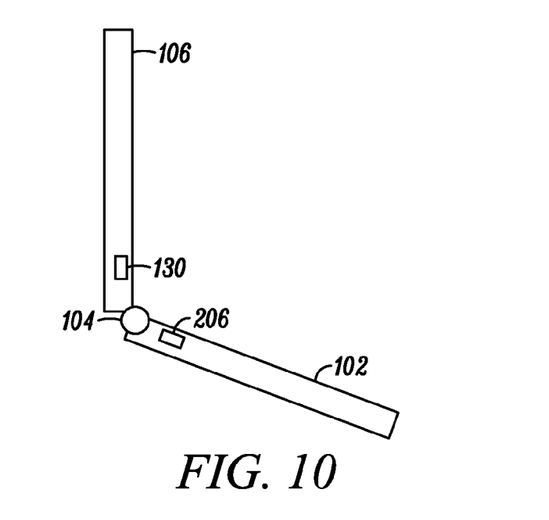
FIG. 10 is a diagram of the cross-sectional view of the mobile electronic device shown in a partially open position and illustrating dual accelerometers.
Figure 11:
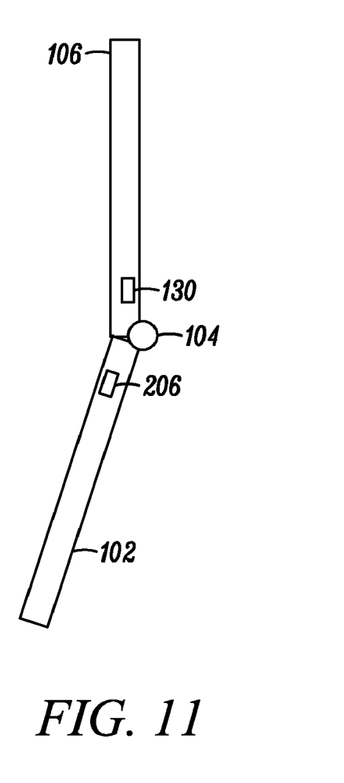
FIG. 11 is a diagram of the cross-sectional view of the mobile electronic device shown in a further partially open position and illustrating dual accelerometers.
Figure 12:
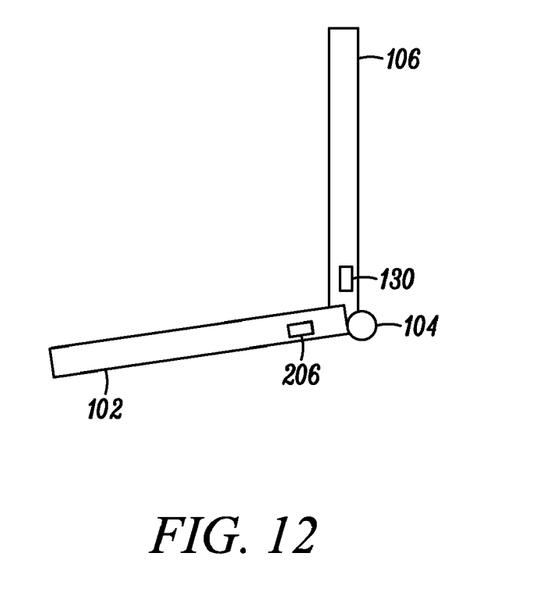
FIG. 12 is a diagram of the cross-sectional view of the mobile electronic device shown in still another partially open position and illustrating dual accelerometers.
Figure 13:
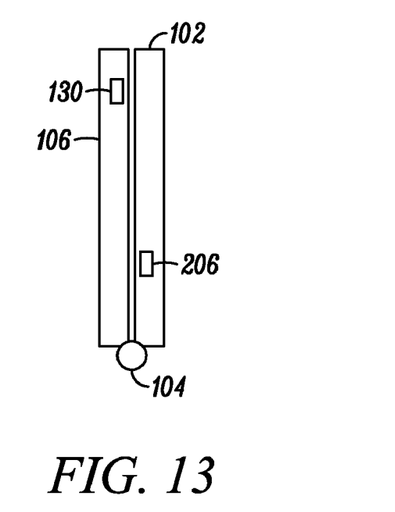
FIG. 13 is a diagram of a cross-sectional view of the mobile electronic device shown in the closed position and illustrating dual accelerometers at a different location.
Figure 14:
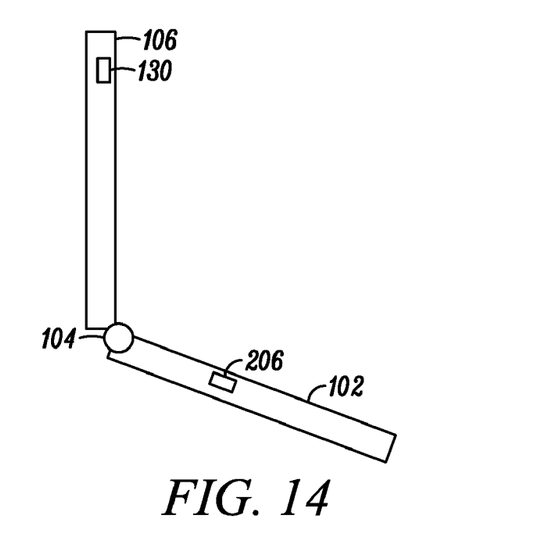
FIG. 14 is a diagram of the cross-sectional view of the mobile electronic device shown in a partially open position and illustrating the dual accelerometers of FIG. 13.
Figure 15:
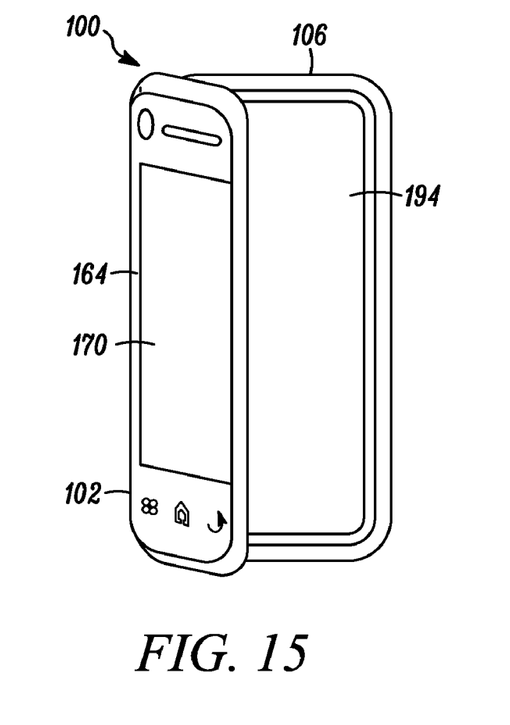
FIG. 15 is a perspective view of the mobile electronic device in orientation/mode 1 wherein the mobile electronic device is standing on one end.
Figure 16:
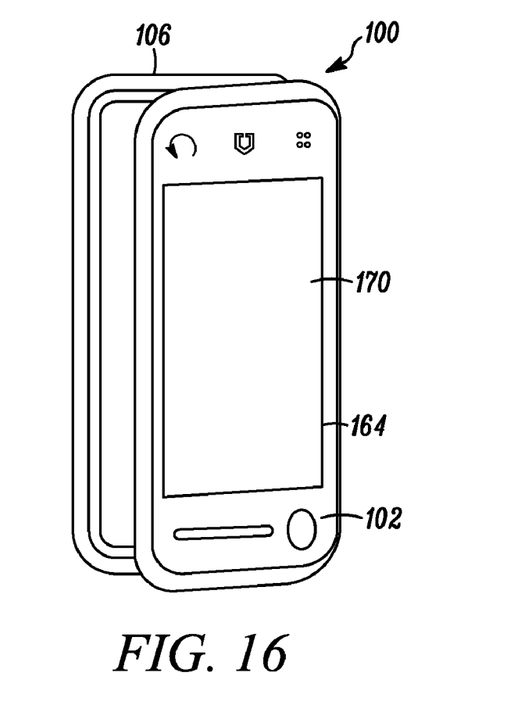
FIG. 16 is a perspective view of the mobile electronic device in orientation/mode 2 wherein the mobile electronic device is standing on the other end in an upside down mode.
Figure 17:
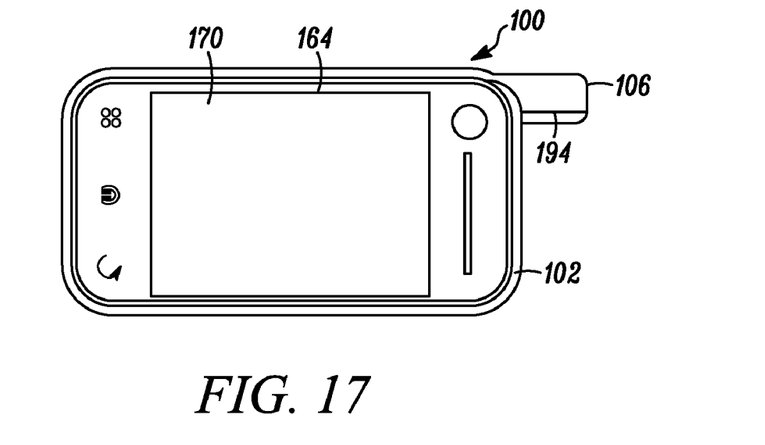
FIG. 17 is a perspective view of the mobile electronic device in orientation/mode 3 wherein the base is placed battery door side down on a surface and the display hangs over an edge of the surface.
Figure 18:
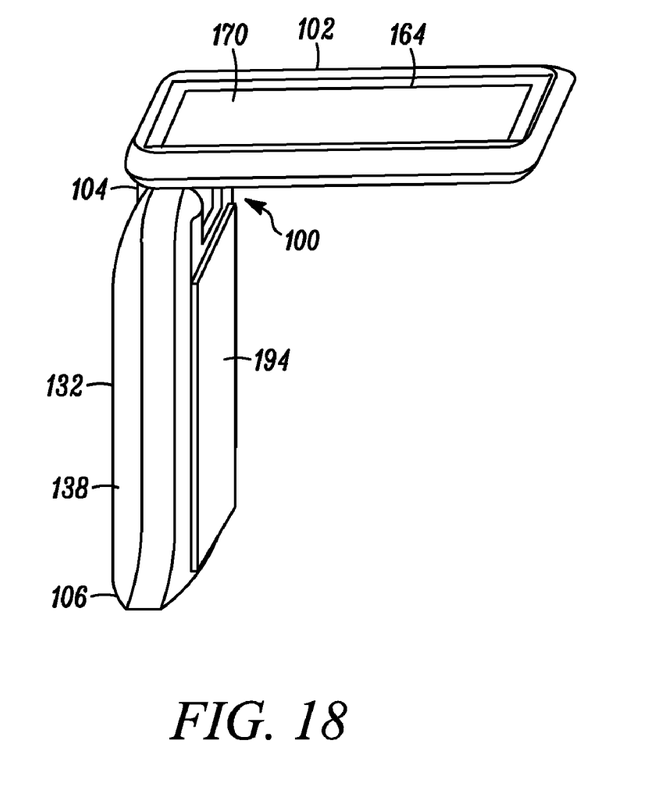
FIG. 18 is a perspective view of the mobile electronic device in orientation/mode 4 wherein the mobile electronic device is placed in a generally inverted L-shaped orientation with the keypad positioned vertically and the display positioned horizontally on a user's side in a landscape orientation with the hinge facing upwardly so that the mobile electronic device is flipped up to view the display.
Figure 19:
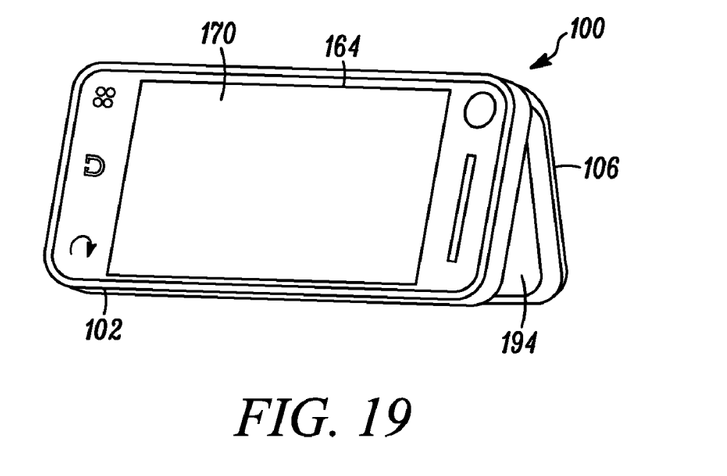
FIG. 19 is a perspective view of the mobile electronic device in orientation/mode 5 wherein an edge of the base and an edge of the flip support the mobile electronic device in a landscape orientation in an upside down V-shaped configuration.
Figure 20:
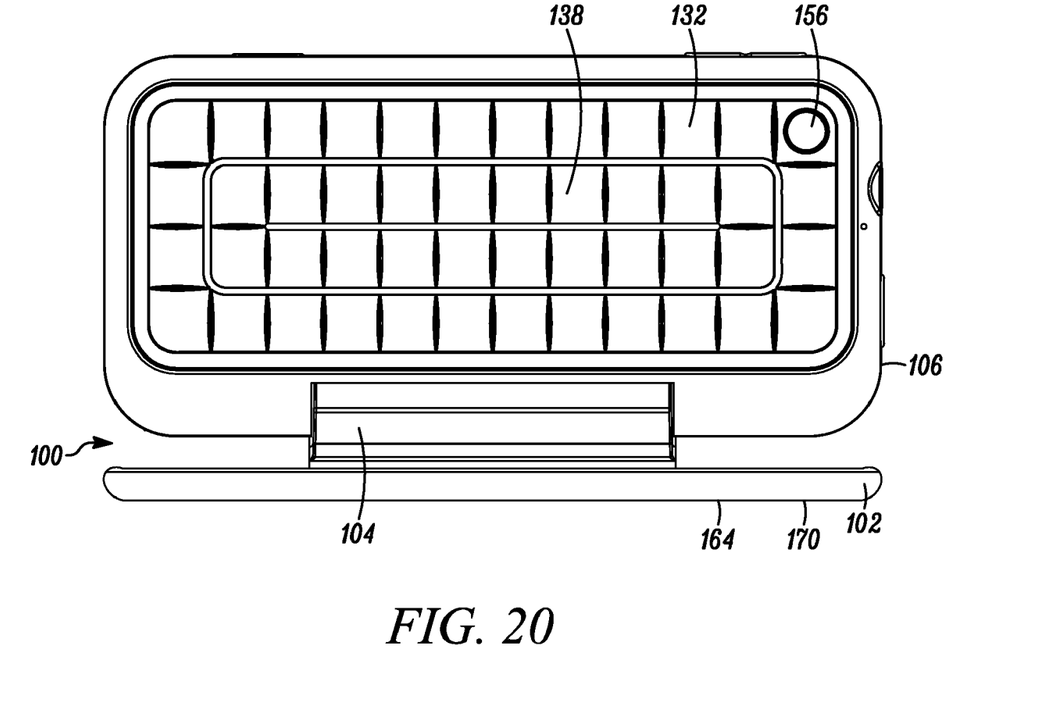
FIG. 20 is a perspective view of the mobile electronic device in orientation/mode 6 wherein the flip is placed with the display down and the transceiver housing is positioned so that the imager can be used as a webcam and/or the flash can be used as flashlight.
Figure 21:
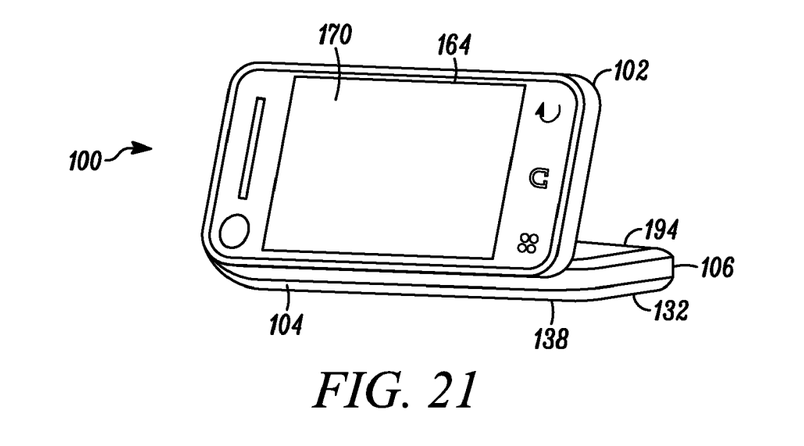
FIG. 21 is a perspective view of the mobile electronic device in orientation/mode 7 wherein the base is placed with the keypad side down and the flip is positioned in a landscape orientation.

Advantageously, the friction hinge provides specific positions of the electronic device including: (1) a closed position in a tablet mode as shown in FIGS. 1 and 2 in which the flip and base are positioned at a zero (0) degree angle relative to each other at a closing torque, (2) a fully open position in a qwerty mode as shown in FIGS. 5 and 6 in which the flip and base are positioned at an open angle at or greater than about 180 degrees at a fully open qwerty torque, and (3) a partially open position in a media viewing mode as shown in FIGS. 3 and 4 in which the flip and base are positioned at an open angle substantially greater than the closed position but substantially less than fully open position at a torque less than the closed torque and the fully open torque.

In the preferred embodiment, the partially open position in the media viewing mode ranges from 70 degrees to 100 degrees and the fully open position is 180 degrees to 190 degrees in the qwerty mode.

Figure 1:
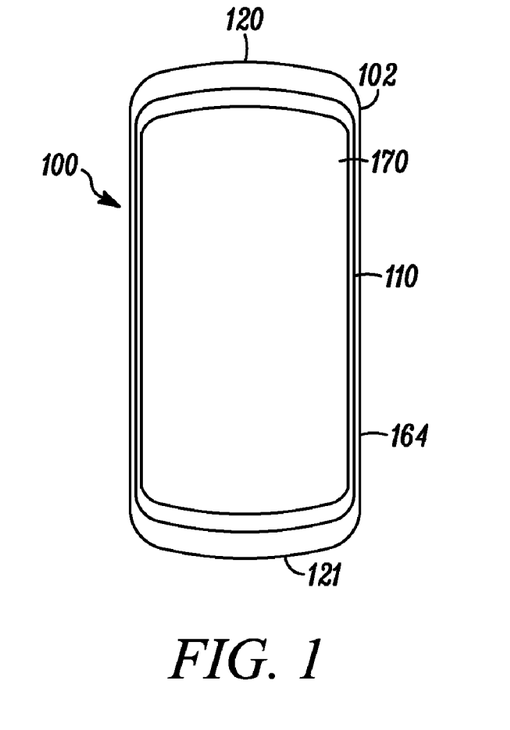
FIG. 1 is a front view of a mobile electronic device in accordance with principle of the present invention of the present disclosure shown in a closed position in a tablet mode in which the flip and base are positioned at a zero (0) degree angle relative to each other.
Figure 2:
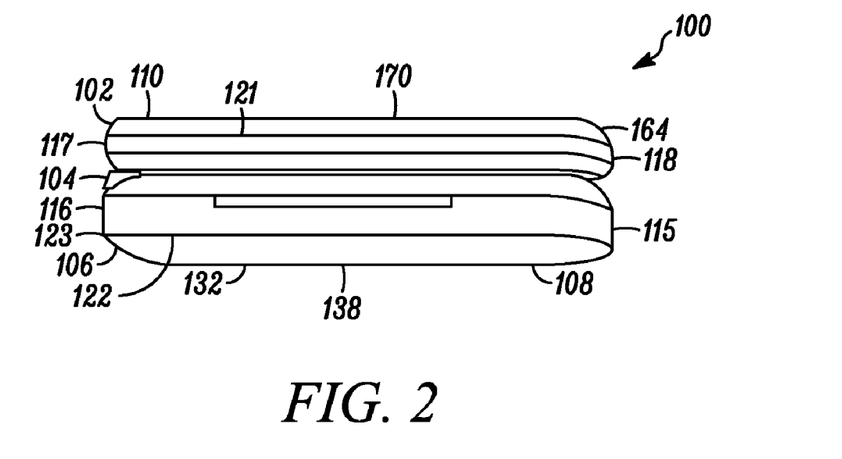
FIG. 2 is a side view of the mobile electronic device shown in the closed position in the tablet mode.

In operation and use, in the tablet mode of FIGS. 1 and 2, the flip is held closed using the first detent in the cam. In the closed position, the interior inwardly facing inward surfaces of the flip and base abut and face each other so as to be hidden from view in the interior of the electronic device and are not accessible to the user. In the closed position in the tablet mode, the exterior outer surfaces of the flip and base are visible and accessible to the user.

Figure 3:
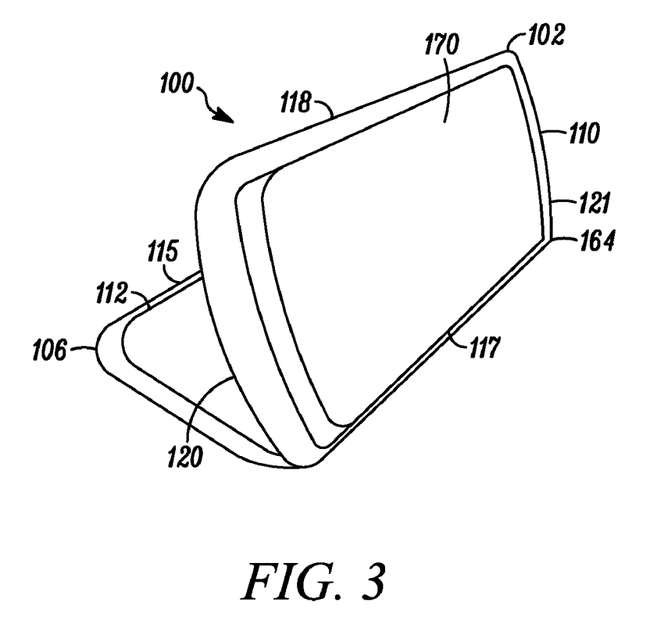
FIG. 3 is a perspective view of the mobile electronic device shown in a partially open position in a media viewing mode.
Figure 4:
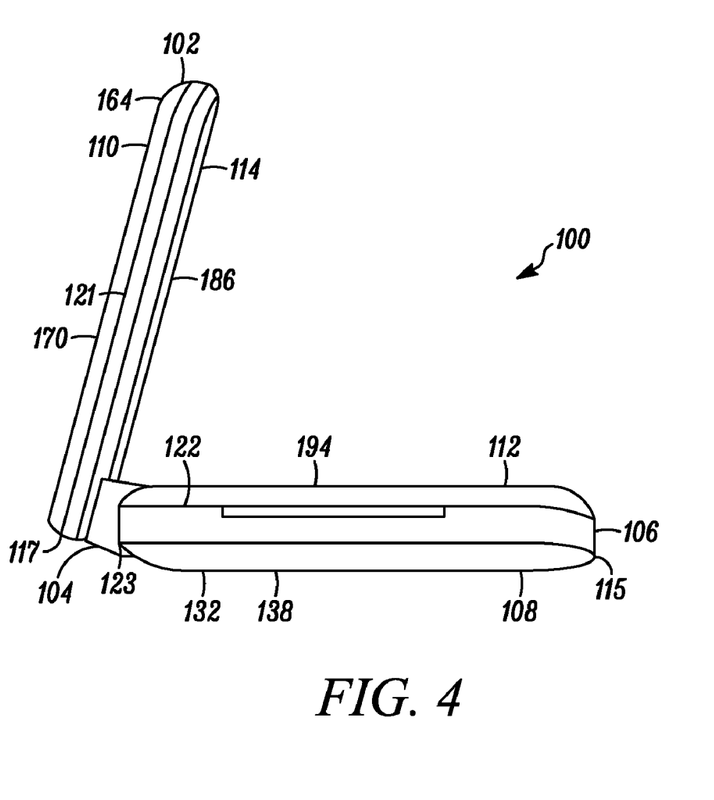
FIG. 4 is a side view of the mobile electronic device shown in the partially open position in the media viewing mode.

In the media viewing mode as shown in FIGS. 3 and 4, the user sets of the desired angle of the flip and the flip is then held open with a holding torque produced by the friction between the asymmetrical cam and the follower. In the partially open, media viewing mode, the user sets the desired angle of the flip to access the inward surfaces of the flip and base.

In the fully open position as shown in FIGS. 5 and 6, the flip is held open about 190 degrees using the second detent in the asymmetrical cam. In the fully open position, the user can readily and fully access the touchpad, keypad, battery door and touchscreen display.

This mobile electronic device can utilize the rear surface of the flip portion of the mobile electronic device for user interface (UI) navigation. When the mobile electronic device is fully opened, a capacitive or resistive touchpad can be positioned on the inward surface of the flip or slide directly behind the display in the outward surface of the flip or slider portion of the mobile electronic device. When the touchpad is touched by the user, the motion of the finger translates to motion within the UI on the forward facing display. This can include highlighting different web links or scrolling through text. It can also include implementing a mouse cursor on the UI which follows the motion of a user's finger on the back of the mobile electronic device.

The capacitive/resistive touch, cursor functionality, and blind navigation techniques in this form for the mobile electronic device is unique and offers many advantages. The detection of multiple partially-open orientations is also novel and provides the user with added functionality beyond that found in typical mobile devices.

Among the many advantages of the mobile electronic device are:
1. Superior capability.
2. Superb performance.
3. Enhanced orientations and modes.
4. Excellent navigation, scrolling, zooming and magnification.
5. Outstanding ability to detect the orientation, angle, position and mode of the flip.
6. Reliable.
7. Comfortable.
8. Portable.
9. User friendly.
10. Easy to use.
11. Durable
12. Economical.
13. Attractive.
14. Efficient.
15. Effective.

Although embodiments of the invention have been shown and described, it is to be understood that various modifications, substitutions, and rearrangements of parts, components, and/or process (method) steps, as well as other uses of the mobile electronic device can be made by those skilled in the art without departing from the novel spirit and scope of this invention.

What is claimed is:

1. A mobile electronic device, comprising:
a base providing a transceiver housing;
a flip pivotably connected to said base by a hinge and pivotable from a closed position, to different partially open positions, and to a fully open position and vice versa;
said base and said flip each having an outward surface, inward surface, longitudinal sides providing edges, and lateral ends;
a keypad on the outward surface of said base, said keypad comprising an imager and an illumination source;
said illumination source being selected from a group consisting of a camera flash, a camera flash light-emitting diode, a xenon flash, a light-emitting bulb and a projector;
a display on the outward surface of said flip;
a touchpad on the inward surface of said flip;
said mobile electronic device detecting the orientation of said mobile device and being movable to different orientations for providing different modes of operation in said partially open positions, said modes comprising:
mode 1 wherein the mobile electronic device is standing on one end of said lateral end;
mode 2 wherein the mobile electronic device is standing on the other end of said lateral end in an upside down mode;
mode 3 wherein the inward side of said base is placed down on a flat surface and said display hangs over an edge of the flat surface;
mode 4 wherein the mobile electronic device is placed in a generally inverted L-shaped orientation with the keypad positioned substantially vertically and the display positioned substantially horizontally on a user's side in a landscape orientation with the hinge facing generally upwardly so that the mobile electronic device is flipped up to view the display;
mode 5 wherein an edge in said edges of the base and an edge of the flip support the mobile electronic device in the landscape orientation in a generally upside down V-shaped configuration;
mode 6 wherein the flip is placed with the display down and the transceiver housing is positioned so that the imager can be used as a webcam or the illumination source can be used as flashlight;
mode 7 wherein the base is placed with the keypad side down and the flip is positioned in the landscape orientation.

2. The mobile electronic device in accordance with claim 1 wherein modes 5 and/or 7 comprise an alarm clock mode.

3. The mobile electronic device in accordance with claim 1 wherein modes 1 and/or 2 comprise a camera tripod mode for capturing images in a self-standing portrait orientation where the mobile electronic device can go into an imager timer mode and the flash can visibly count the time to image capture.

4. The mobile electronic device in accordance with claim 1 wherein mode 6 is selected from a group consisting of:
a webcam mode in a self-standing landscape orientation where the mobile electronic device links to a computer or other device as a webcam and the touchpad on the flip can be used for zoom functionality and/or screen capture;
a projector mode in a self-standing landscape orientation wherein said illumination source is a projector which projects an image from the mobile electronic device and said touchpad on said flip can be used for mouse cursor or zoom functionality;
and a flashlight mode in a self-standing landscape orientation wherein the mobile electronic device is placed on the display side down in the partially open position and the illumination source enters a torch mode.

5. The mobile electronic device in accordance with claim 1 wherein mode 4 can comprise a holster mode wherein the mobile electronic device is placed on a user's side in a landscape orientation with the hinge facing generally upwardly and the mobile electronic device is flipped up to view the display without unholstering.

6. The mobile electronic device in accordance with claim 1 wherein modes 3, 5 and/or 7 are selected from a group consisting of: a global positioning system (GPS) mode, music player mode, video player mode, phone mode, slide show mode, alarm clock mode, speakerphone mode, videoconference mode, video camera mode, and any combination of the preceding.

7. The mobile electronic device in accordance with claim 1 including an accelerometer in said flip or said base for detecting said orientation and mode.

8. The mobile electronic device in accordance with claim 1 comprising two accelerometers to replace the typical use of a magnetic sensor wherein one accelerometer resides in said flip and another accelerometer resides in said base and algorithms are used to detect the difference in position of the two accelerometers and thus the orientation and flip position of the device.

9. The mobile electronic device in accordance with claim 8 comprising two accelerometers for detecting said orientation, mode and flip angle without the need for magnetic sensors.

10. The mobile electronic device in accordance with claim 1, wherein:

said display comprises a touchscreen display; said imager is selected from a group consisting of a camera, camera lens, zoom lens, and web cam;

said mobile electronic device is selected from a group of consisting of a flip phone, portable networking device, internet communications device, clamshell device, radio telephone, cellular phone, mobile phone, smart phone, portable gaming device, personal digital assistant, wireless e-mail device, two-way pager, handheld electronic device, and combinations thereof; and said mobile electronic device is of a compact size for readily fitting in a shirt pocket, pants pocket, suit pocket, and/or purse.

11. A mobile electronic device comprising:

a base providing a transceiver housing and defining a compartment for containing a battery;

a flip pivotably connected to said base by a hinge and pivotable from a closed position, to various partially open positions and to a fully open position and vice versa; said base and said flip each having an outward surface and an inward surface;

a keypad on the outward surface of said base, said keypad comprising an imager and an illumination source, said keypad selected from a group consisting of a qwerty keypad, capacitive keypad, recessed keypad, keyboard, alphanumeric keys, and a base touch screen, said keypad facing downwardly when said flip is in said partially open position, said imager being selected from a group consisting of a camera, camera lens, zoom lens, and web cam;

said illumination source being selected from a group consisting of a camera flash, a camera flash light-emitting diode, a xenon flash, a light-emitting bulb and a projector;

a display on the outward surface of said flip, said display being positioned opposite to said keypad when said flip is in said closed position, said display facing upwardly with and in proximity to said keypad when said flip in said fully open position, and said display being positioned at an angle of inclination when said flip is in the partially open positions;

a touchpad on the inward surface of said flip and positioned transversely opposite of said display, and said touchpad being substantially hidden and inaccessible when said flip is in said closed position;

said mobile electronic device detecting the orientation of said mobile device and being movable to different orientations for providing different modes of operation in said partially open positions, said modes comprising:

mode 1 wherein the mobile electronic device is standing on one end of said lateral end;

mode 2 wherein the mobile electronic device is standing on the other end of said lateral end in an upside down mode;

mode 3 wherein the inward side of said base is placed down on a flat surface and said display hangs over an edge of the flat surface;

mode 4 wherein the mobile electronic device is placed in a generally inverted L-shaped orientation with the keypad positioned substantially vertically and the display positioned substantially horizontally on a user's side in a landscape orientation with the hinge facing generally upwardly so that the mobile electronic device is flipped up to view the display;

mode 5 wherein an edge in said edges of the base and an edge of the flip support the mobile electronic device in the landscape orientation in a generally upside down V-shaped configuration;

mode 6 wherein the flip is placed with the display down and the transceiver housing is positioned so that the imager can be used as a webcam or the illumination source can be used as flashlight;

mode 7 wherein the base is placed with the keypad side down and the flip is positioned in the landscape orientation.

12. The mobile electronic device in accordance with claim 11 including an accelerometer in said flip or said base for detecting said orientation and mode.

13. The mobile electronic device in accordance with claim 11 comprising two accelerometers to replace the typical use of a magnetic sensor wherein one accelerometer resides in said flip and another accelerometer resides in said base and algorithms are used to detect the difference in position of the two accelerometers and thus the orientation and flip position of the device.

14. The mobile electronic device in accordance with claim 11 wherein:

the modes 5 and/or 7 comprise an alarm clock mode;

the modes 1 and/or 2 comprise a camera tripod mode for self-standing portrait orientation in which the mobile electronic device is an imager timer mode and the camera flash visibly counts down the time to image capture;

the mode 6 comprises a webcam mode in a self-standing landscape orientation wherein the mobile electronic device links to a computer as a webcam and said touchpad on said flip can be used for zoom functionality and/or screen capture;

or the mode 6 comprises a projector mode in a self-standing landscape orientation wherein said illumination source is a projector which projects an image from the mobile communication device and said touchpad on said flip can be used for mouse cursor or zoom functionality;

or the mode 6 comprises a flashlight mode in a self-standing landscape orientation wherein the mobile electronic device is placed display side down in a partially open position and the illumination source enters a torch mode;

mode 4 comprises a holster mode wherein the mobile electronic device is placed on a user's side in a landscape orientation with the hinge facing generally upwardly and the mobile electronic device is flipped up to view the display without unholstering.

15. The mobile electronic device in accordance with claim 11 wherein the modes 3, 5 and/or 7 are selected from a group consisting of a global positioning system (GPS) mode, music player mode, video player mode, phone mode, slide show mode, alarm clock mode, speakerphone mode, videoconference mode, video camera mode, and any combination of the preceding.

16. A mobile electronic device comprising: a base providing a transceiver housing and defining a compartment for containing a battery;

a flip pivotably connected to said base by a hinge and pivotable from a closed position, to partially open positions and to a fully open position and vice versa; said base and said flip each having an outward surface, an inward surface, longitudinal sides providing edges, and lateral ends;

said flip being positioned at a flip angle relative to said base, said flip angle consisting of an angle of inclination of said flip relative to said base and ranging from zero to about 190 degrees;

a keypad on the outward surface of said base, said keypad selected from a group consisting of a qwerty keypad, capacitive keypad, recessed keypad, keyboard, alphanumeric keys, and a base touchscreen, said keypad facing downwardly when said flip is in said partially open position in a media viewing mode; an imager in said keypad, said imager comprising a camera for video conferencing or still image photography;

a camera flash in proximity to said imager in said keyboard, said camera flash being selected from a group consisting of a camera flash light-emitting diode, light-emitting bulb, xenon flash and an illumination source;

a touchscreen display on the outer surface of said flip, said display being positioned opposite to said keypad when said flip is in a closed position in a tablet mode, said display facing upwardly with and in proximity to said keypad when said flip is in said fully open position in a text entry mode, and said display being positioned at the angle of inclination when said flip is in the partially open positions; a capacitive touchpad on the inward surface of said flip and positioned transversely opposite of said display, and said touchpad being substantially hidden and inaccessible when said flip is in said closed position;

an accelerometer in said flip or said base for detecting device orientation and mode;

said mobile electronic device detecting the orientation of said mobile device and being movable to different orientations for providing different modes of operation in said partially open positions, said modes comprising:

mode 1 wherein the mobile electronic device is standing on one end of said lateral end;

mode 2 wherein the mobile electronic device is standing on the other end of said lateral end in an upside down mode;

mode 3 wherein the inward side of said base is placed down on a flat surface and said display hangs over an edge of the flat surface;

mode 4 wherein the mobile electronic device is placed in a generally inverted L-shaped orientation with the keypad positioned substantially vertically and the display positioned substantially horizontally on a user's side in a landscape orientation with the hinge facing generally upwardly so that the mobile electronic device is flipped up to view the display;

mode 5 wherein an edge in said edges of the base and an edge of the flip support the mobile electronic device in the landscape orientation in a generally upside down V-shaped configuration;

mode 6 wherein the flip is placed with the display down and the transceiver housing is positioned so that the imager can be used as a webcam or the illumination source can be used as flashlight;

mode 7 wherein the base is placed with the keypad side down and the flip is positioned in the landscape orientation.

17. The mobile electronic device in accordance with claim 16 comprising two accelerometers to replace the typical use of a magnetic sensor wherein one accelerometer resides in said flip and another accelerometer resides in said base and algorithms are used to detect the difference in position of the two accelerometers and thus the orientation and flip position of the device.

18. The mobile electronic device in accordance with claim 16 comprising two accelerometers for detecting said orientation and mode and the flip angle without the need for magnetic sensors.

19. The mobile electronic device in accordance with claim 16 wherein: said mobile electronic device is selected from a group of consisting of a flip phone, portable networking device, internet communications device, clamshell device, radio telephone, cellular phone, mobile phone, smart phone, portable gaming device, personal digital assistant, wireless e-mail device, two-way pager, handheld electronic device, and combinations thereof; said mobile electronic device is of a compact size for readily fitting in a shirt pocket, pants pocket, suit pocket, and/or purse;

said modes 5 and/or 7 comprise an alarm clock mode wherein the mobile electronic device acts as an alarm clock;

said modes 1 and/or 2 comprise a camera tripod mode for self-standing portrait orientation wherein the mobile electronic device is in an imager timer mode and the flash visibly counts down the time to image capture;

said mode 6 is selected from a group consisting of a webcam mode in a self-standing landscape orientation wherein the mobile electronic device links to a computer as a webcam and the touchpad is used for zoom functionality and/or screen capture; and a flashlight mode in a self-standing landscape orientation wherein the mobile electronic device is placed display side down in a partially open position and the flash automatically enters a torch mode;

said mode 4 comprises a holster mode wherein the mobile electronic device is placed on a user's side in a landscape orientation with the hinge facing generally upwardly and the mobile electronic device flipped up to view the display without unholstering;

and said modes 3, 5 and/or 7 are selected from a group consisting of a global positioning system (GPS) mode, music player mode, video player mode, phone mode, slide show mode, alarm clock mode, speakerphone mode, videoconference mode, video camera mode, and any combination of the preceding.

* * * * *